United States Patent
Di Giugno et al.

(10) Patent No.: US 8,631,697 B2
(45) Date of Patent: Jan. 21, 2014

(54) MEASURING DEVICE, CONTAINER AND SYSTEM FOR MONITORING AND MANAGING A CONTAINER

(75) Inventors: Mario Di Giugno, Galbiate (IT); Flavio Giovanelli, Cesano Boscone (IT); Simone Tiraboschi, Grumello del Monto (IT); Pietro Villa, Bergamo (IT)

(73) Assignee: Cefriel—Societa' Consortile a Responsabilita' Limitata (IT)

( * ) Notice: Subject to any disclaimer, the term of this patent is extended or adjusted under 35 U.S.C. 154(b) by 0 days.

(21) Appl. No.: 13/518,205

(22) PCT Filed: Dec. 22, 2009

(86) PCT No.: PCT/IB2009/055908
§ 371 (c)(1),
(2), (4) Date: Sep. 12, 2012

(87) PCT Pub. No.: WO2011/077187
PCT Pub. Date: Jun. 30, 2011

(65) Prior Publication Data
US 2012/0330850 A1    Dec. 27, 2012

(51) Int. Cl.
*G01F 23/26* (2006.01)
(52) U.S. Cl.
USPC ........................................................ 73/304 C
(58) Field of Classification Search
USPC ....................................................... 73/304 C
See application file for complete search history.

(56) References Cited

U.S. PATENT DOCUMENTS

| | | | |
|---|---|---|---|
| 4,099,167 A * | 7/1978 | Pomerantz et al. | 340/620 |
| 5,465,619 A | 11/1995 | Sotack et al. | |
| 2005/0217369 A1 | 10/2005 | Holappa et al. | |
| 2009/0126473 A1 * | 5/2009 | Porat et al. | 73/149 |

FOREIGN PATENT DOCUMENTS

| | | |
|---|---|---|
| CH | 557462 A | 12/1974 |
| DE | 2504212 A1 | 8/1976 |
| DE | 102007001175 A1 | 7/2008 |
| EP | 1818281 A1 | 8/2007 |
| WO | 2004110659 A2 | 12/2004 |
| WO | 2008085060 A1 | 7/2008 |

* cited by examiner

*Primary Examiner* — Hezron E Williams
*Assistant Examiner* — Paul West
(74) *Attorney, Agent, or Firm* — Laubscher & Laubscher, P.C.

(57) ABSTRACT

A measuring device for detecting a filling status of a containing cavity suitable for containing non-homogenous objects of various nature includes a capacitive device that is positionable near the containing cavity and configured for detecting a variation in electric capacity caused by the presence of the objects so as to determine the filling status. A container is provided with the measuring device. A system is provided including the measuring device and a station configured for receiving and processing data provided by the measuring device, the system being configured for managing and monitoring the filling status and planning intervention activities on the containing cavity. The system is used for monitoring and managing urban waste.

21 Claims, 8 Drawing Sheets

MEASURING DEVICE, CONTAINER AND SYSTEM FOR MONITORING AND MANAGING A CONTAINER

This application is a §371 National Stage of PCT International Application No. PCT/IB2009/055908 filed Dec. 22, 2009. The entire content of this application is incorporated herein by reference.

The invention relates to a measuring device, a container and a system for monitoring and managing a container that is suitable for containing various objects in multiple fields of application.

In particular, the measuring device according to the invention enables the filling status and/or the filling level of the container to be measured in contexts in which the conferred objects are heterogeneous and unpredictable in terms of type, shape and material.

In particular, the container is suitable for containing non-homogenous objects of different nature, for example unsorted waste, such as urban refuse.

Skips with rather large dimensions are known for collecting urban waste, which are provided with sensors comprising load cells or strain-gauge elements that are suitable for measuring the weight of the refuse contained therein. Suck skips are able to send a signal indicating the weight contained therein. This signal can be received by an approaching vehicle designed to empty skips and collect waste.

Containers are further known for collecting waste that are provided with optic barrier sensors, or ultrasound sensors, which are suitable for supplying a signal when the filling level inside the containers reaches a set level. A system is provided for managing containers that provides for the aforesaid signal sent by the containers being received from a suitable station that plans the path of a collecting vehicle in function of the filling status of the various containers located in the urban area.

A drawback of the known containers discussed above is that they are rather complex to construct and entail rather a high cost. Further, maintenance and repair costs for possible damage to the aforesaid containers can be significant. From the economic point of view this makes it uneconomical to adopt such sensors on containers or at most makes it feasible to apply such sensors onto to containers of large dimensions in order to be able to amortise the cost thereof. Nevertheless, the containers of large dimensions are suitable for being distributed along roads and or/wide spaces but are not suitable for being located in zones such as pavements, parks, etc.

One object of the invention is to improve the measuring devices, the known containers, in particular containers for collecting waste, and the systems for managing the containers.

Another object of the invention is to provide a measuring device that is simple and economical in contruction, management and maintenance terms and is able to report the operating conditions or status of the container and/or other information rapidly, precisely and efficiently.

The invention can be better understood and implemented with reference to the attached drawing that illustrate some embodiments thereof by way of non-limiting example, in which.

Figure 1:
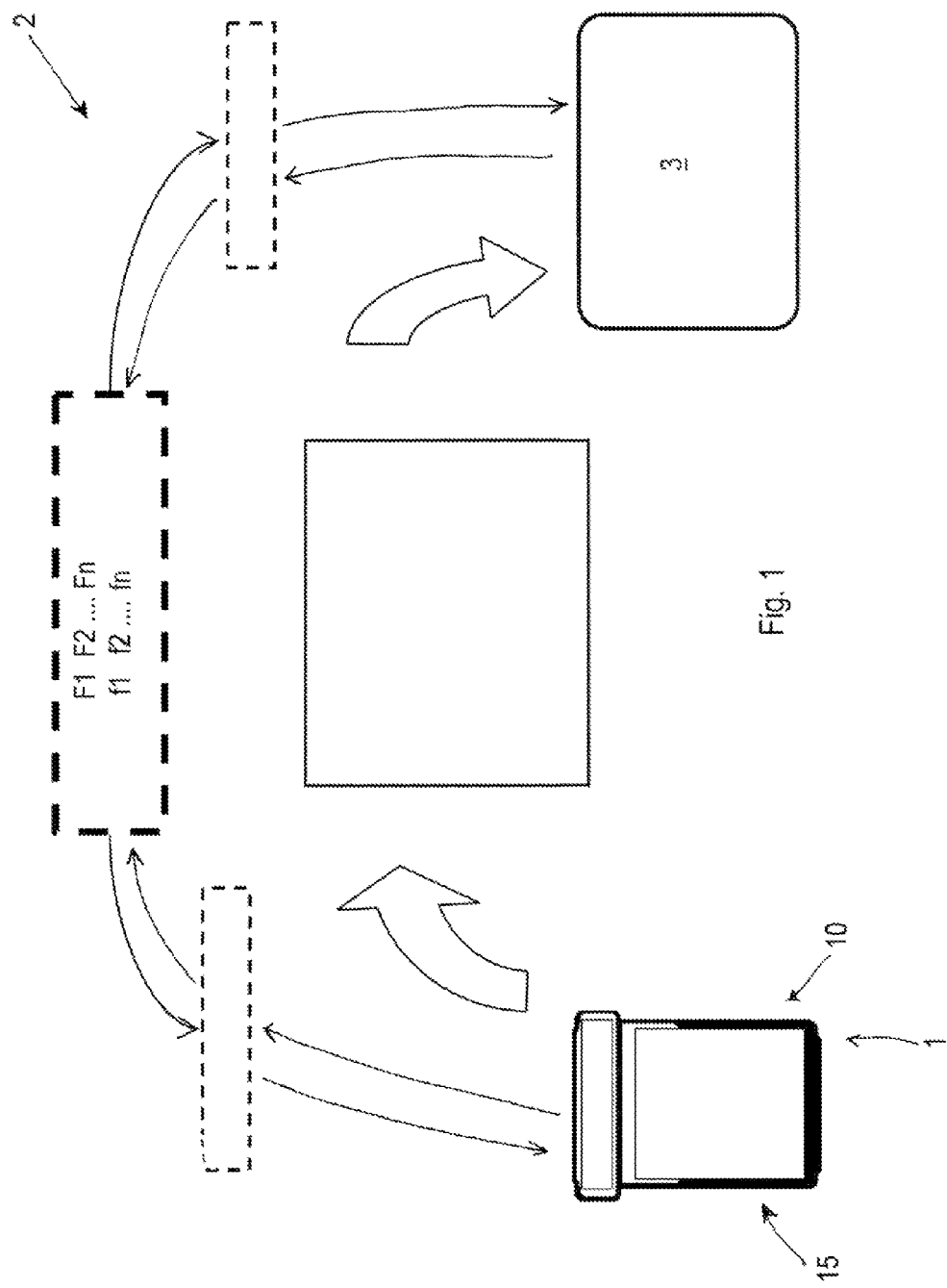
FIG. 1 is a functional architecture diagram of a container provided with a measuring device and with a system for monitoring and managing this container.

With reference to FIG. 1, there is shown schematically a container 1 provided with a measuring device 10 according to the invention. The measuring device 10, which will be disclosed in detail below, is used to measure and/or detect a filling status of the container 1. In other words, the measuring device 10 acts to detect whether the container 1 is in a total filling condition, or acts to detect possible occlusion at a mouth of the container 1. Owing to a warning of the measuring device 10, it is possible in this manner to act promptly to empty the container 1. The measuring device 10 can further be configured for measuring the progressive filling of the container 1, or for measuring periodically the filling level of the container 1, as will be shown in detail by the description. FIG. 1 shows schematically the functional architecture of a system 2 for monitoring and managing the container 1. The system 2 can be used in various applications and/or industrial environments to detect and/or measure the degree of filling of container 1 when the latter is intended to contain multiple objects that are heterogeneous and unpredictable in terms of type, shape and material. In other words, the container 1 can receive non-homogenous objects of different nature.

In an application that is disclosed below in a non-limiting manner, the container/s 1, is/are suitable for receiving and containing non-homogenous objects of various nature, for example unsorted waste, such as urban waste. In this case, a plurality of containers 1 is provided distributed over an urban area. The system 2 enables the filling status of each container 1 to be monitored owing to the configuration of the latter that will be disclosed below, and enables waste collection and disposal operations to be managed in an optimum manner in an urban area.

The container 1 is particularly suitable for being located at several points within an urban area, in particular in public gardens, on pavements, squares, etc. The container 1 can have reduced dimensions so as to enable the positioning thereof on zones of any extent. In this case, the container 1 is not bulky and does not necessarily require great space, unlike prior-art urban waste containers. The container 1 is thus particularly suitable for receiving waste of various kinds from pedestrians and/or passers-by in any zone of the city. The container 1 can have a height between 40 cm and 140 cm, and can have a width and a depth between 20 cm and 80 cm. In particular, the container can have three different sizes. A first size, specified in FIG. 1, provides a width and a depth that are substantially equal to 50 cm, and a height that is substantially equal to 80 cm. A second size provides a width and a depth that are substantially equal to 60 cm, and a height that is substantially equal to 100 cm. A third size provides a width and a depth that are substantially equal to 35 cm, and a height that is substantially equal to 50 cm. Nevertheless, the container 1 associated with the measuring device 10 can have any desired dimension and shape.

The various parts that comprise the system 2, in particular the various parts of which the container 1 is made, have great resistance to atmospheric agents and great mechanical resistance to blows, vibrations and wear.

The system 2 is configured for performing functions that according to requested requirements and to the degree of importance that it is desired to assign thereto include main functions F1, F2. . . Fn, which may be of basic importance, and secondary functions f1, f2. . . , fn, which may be optional and/or desired. The main functions that the system 2 can perform include: detecting the occlusion of the mouth of the container 1, detecting full or empty status of the container 1, temporal indication of the measurement. Further useful functions are: detecting the filling level of the container 1, detecting a state of blockage or obstruction of the container 1, localising the container 1, promptly warning that the contain may exceed the filling threshold of the container 1. Information/data 26 acquired by the system 2 is sent to a departmental station 3 associated with a set territorial fraction of the town. The departmental station 3 includes a data-gathering and analysis center. In one embodiment, the departmental station 3 is configured for monitoring a plurality of containers 1 located in several zones of an area, such as an urban area, and further includes a monitoring and management unit that is able to plan and program the path of one or more vehicles employed to empty containers 1 and collect the waste contained therein. Several department stations 3 can be provided, each having distinct urban territorial competence, and a central station 19 to which all the departmental stations 3 are connected. Obviously, it is possible to have a single departmental station 3, which in this case coincides with the central station 19.

Figure 2:
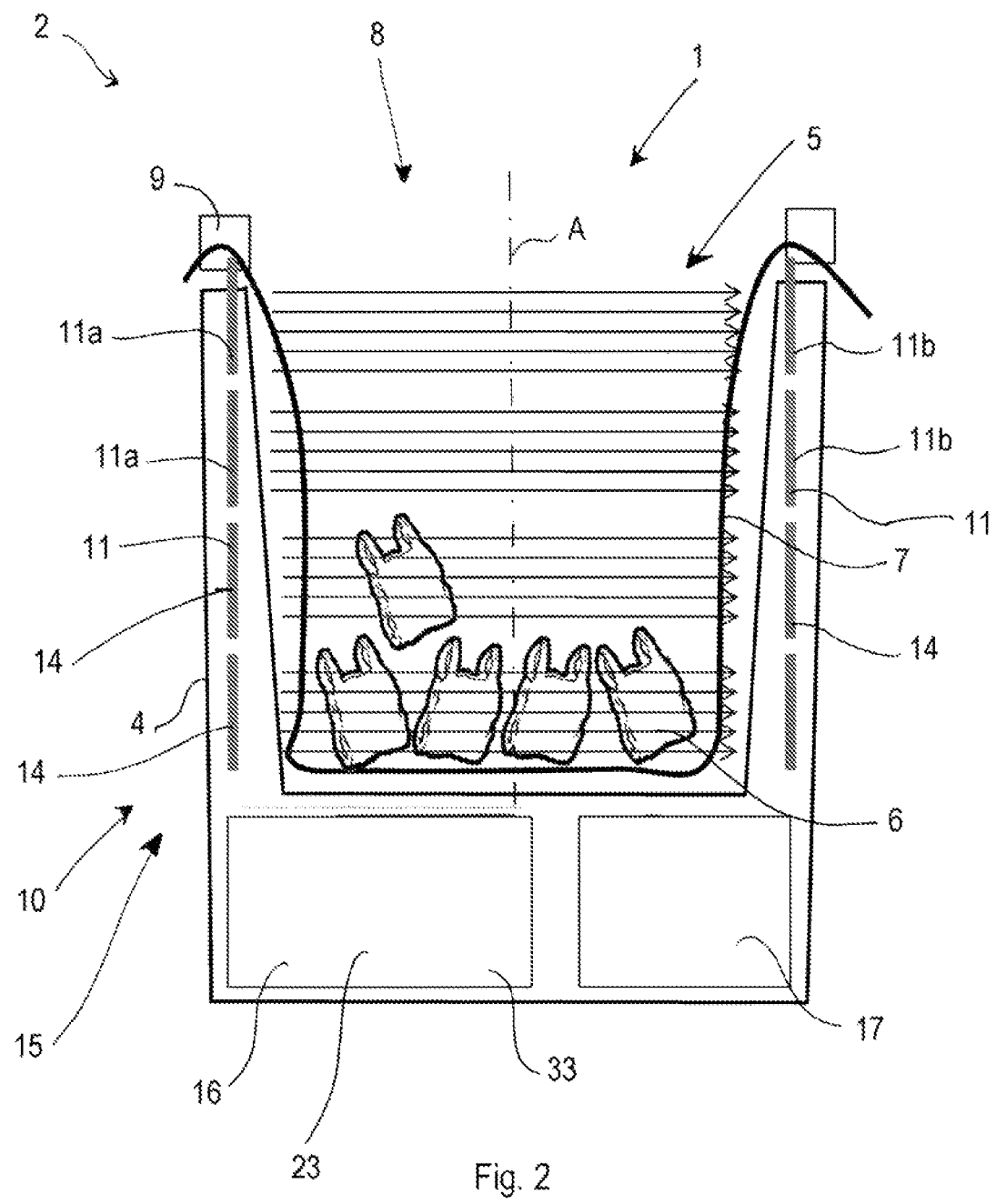
FIG. 2 is a schematic section view of a container according to the invention.

In FIG. 2 there is shown the container 1 according to the invention. The container 1 includes a casing 4 that defines a containing cavity 5 that is suitable for receiving objects, such as waste 6. The containing cavity 5 extends along a longitudinal axis A. The casing 4 is shaped to house a bag 7 or similar elements that are suitable for receiving the waste 6 that users throw inside the container 1. The bag 7 enables the container 1 to be emptied rapidly, for example by an operator 12. The operator 12 extracts the bag 7 full of waste 6 from the container 1 to transfer the waste to a collecting vehicle 13.

In the embodiment in FIG. 2, the waste 6 is introduced into the container 1 through an opening 8 associated with the casing 4.

The container 1 includes a lid element 9, which can be removably connected or can be hinged on the casing 4 and which is used to constrain an upper part of the bag 7 to the container 1. In particular, the upper part of the bag 7, during use, is locked between the lid element 9 and an upper end zone of the casing 4.

The container 1 is provided with the measuring device 10, configured for detecting the filling status of the containing cavity 5.

The device 10 is of a capacitive type, i.e., it includes one or more elements of capacitive type, i.e., one or more capacitors 14. The device 10 is provided with at least one pair of metal plates 11, each pair defining a capacitor 14. Each pair of plates 11 includes a first pair 11a and a second pair 11b, arranged on or in the casing 4, on opposite sides to one another. In particular, the first metal plates 11a and the second metal plates 11b are positioned such as to be on opposite sides to the bag 7. In other words, the bag 7 is interposed between the first metal plates 11a and the second plates 11b. The set of plates 11 associated with the container 1 defines a capacitor system 15.

The operating principle of the device 10 is based on the variation of the electric capacity of this capacitor system 15, through the effect of the introduction of one or more objects inside the container 1. In particular, the measuring device 10 detects variations in the value of electric capacity that are due to the introduction of objects, such as waste 6, inside the containing cavity 5.

When the containing cavity 5 is empty, or only the bag 7 is present, the electric capacity has a set value that substantially depends on the dielectric constant of the air.

In this situation, it is possible to measure a capacity value of the capacitor system 15 "empty".

The various materials of which the waste consists that are deposited in the container 1 are characterised by a dielectric constant that is different from the quality of the air.

By measuring a variation in the capacity of the capacitor system 15, it is possible to detect the presence of the waste.

An object 6 is detected as introducing the object 6 inside the containing cavity 5 determines a variation in the dielectric constant. Detecting an object 6 can also occur through the effect of a variation in the geometry of the equivalent capacity. This occurs if the introduced object is of a conductive material that causes the resulting capacity to increase or decrease.

The measuring device 10 includes an electronic unit 16 connected to the plates 11, and provided with a local file 23, including a local memory 33. A supply source 17 is provided for supplying the electronic unit 16 and the plates 11. The supply source, in particular, includes a battery 17. The battery 17 may include a rechargeable cell. A recharging device may be provided that is included in the container 1, to recharge the battery 17. The recharging device can include a photovoltaic panel that is able to recharge the battery 17 with solar energy. In all cases, the type of power supply chosen is such as to have great resistance to environmental factors, require minimal maintenance, contain costs and simplify the management thereof and is such as to minimise environmental impact.

The device 10, is able to measure periodically and store the quantity of waste contained inside the container 1 by way of the electric unit 16.

By arranging several capacitors that are suitably positioned on the container 1 it is possible to define filling "levels" and consequently to provide a discrete filling measurement.

As shown in the embodiment in FIG. 2, the device 10 comprises a plurality of first metal plates 11a and of second plates 11b. Owing to this configuration, the device 10 is able to detect in a discrete and progressive manner various filling levels of the containing cavity 5.

The dimension and the position of the plates 11 is chosen in function of the degree of precision and discreteness of the measurement that it is desired to obtain. The greater the number of plates 11 and the less the dimension of the latter, the greater will be the resolution of the measurement and thus the greater will be the number of detectable and monitorable filling "levels". Each metal plate 11 can have a height comprised between 10 and 30 cm, and a width comprised between 30 and 70 cm. In the described embodiment, in particular but not in a limiting manner, each metal plate 11 has a height that is substantially equal to 21 cm, and a width that is substantially equal to 55 cm.

Owing to the measuring device 10 that is thus configured it is possible to obtain an effective and precise filling measurement of the container 1 that is independent of the type and/or geometry and/or materials of which the waste 6 is composed. The measuring device 10 is very reliable in reporting the filling level of the container 1 and prevents false negative signals on container 1 status from being generated.

With a suitable arrangement of several plates 11 and a processing algorithm of the signal/s supplied by the latter it is possible also to conduct shape measurements on the objects 6 introduced into the containing cavity 5.

The measuring device 10 may also operate in continuous mode.

This may be useful for counting the number of introductions of objects/waste into the container 1.

The measuring device 10 is also able to detect the occlusion of the containing cavity 5 by bags and other obstructive materials, regardless of whether the filling threshold has been reached. This occlusion measurement could occur through luminosity sensors, such as phototransistors or photocells suitably placed inside the containing cavity 5.

By adding further external sensors it is possible to count the number of persons in transit near the container 1.

The measuring device 10 is further configured to be mounted without problems on known containers that are already used for collecting waste. The measuring device 10 is able to be easily adapted to all known types and sizes of container having different geometrical shapes.

The measuring device 10 according to the invention is very cheap and also very difficult to tamper with and is therefore secure against acts of vandalism.

In a first embodiment, the container 1 is configured for sending data directly to the departmental station 3 and/or to the central station 19 by a communication device 24 of GPRS type included in the container 1. In this case the container 1 can be configured for transmitting data in real time. This can be provided for the entire area or for set zones of the latter. It may be useful to be able to dispose of data in real time in zones of particular/critical interest. It is possible to set up the container 1 in such a manner that the latter acquires data and information also from other similar containers within the zone and send all the data to the central station 19 and/or to the departmental station 3. In this case, a detailed analysis of a given set of containers 1 is conducted. At the end of this detailed analysis, further containers 1 can be selected that are located in other urban zones so as to define a new set of containers 1 to be monitored directly, remotely, and in real time. The container 1 provided with the GPRS module could gather and convey the data of the containers placed near itself inside an area with a high density of containers (for example in which the distance between adjacent containers 1 is less than approximately 100 metres).

Figure 3:
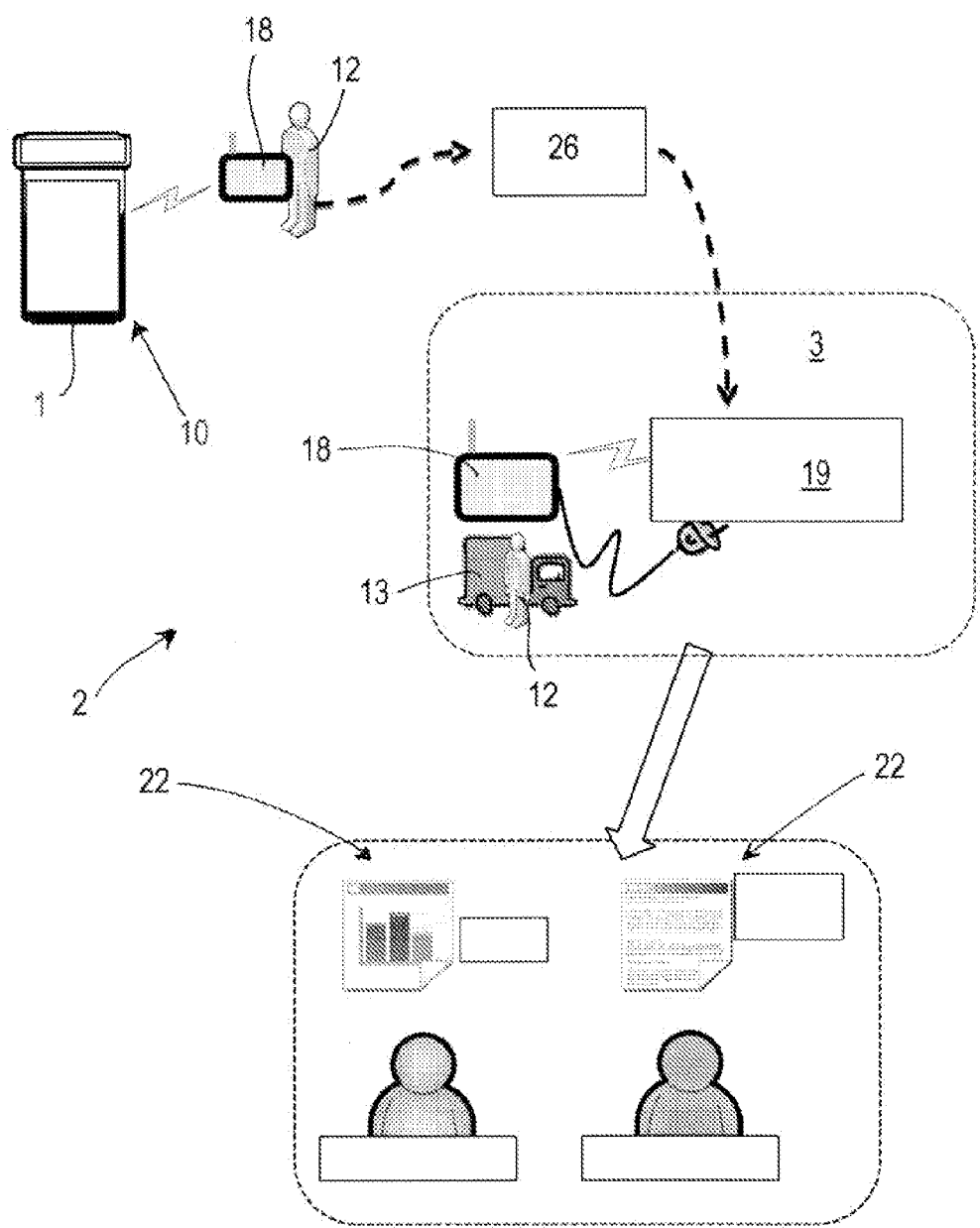
FIG. 3 shows schematically an operating mode of the system.
Figure 4:
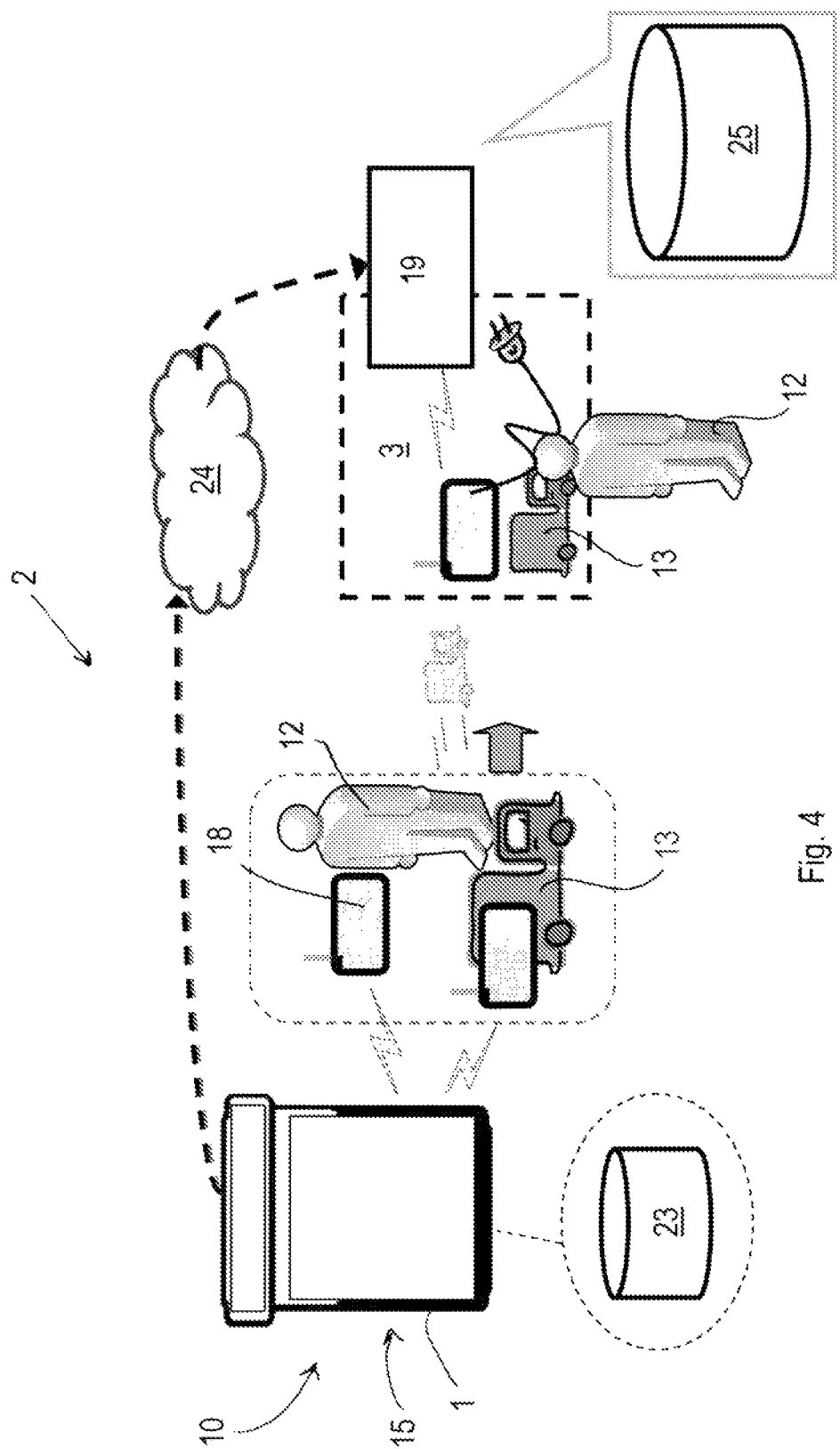
FIG. 4 is another schematic view of operating modes of the system.
Figure 7:
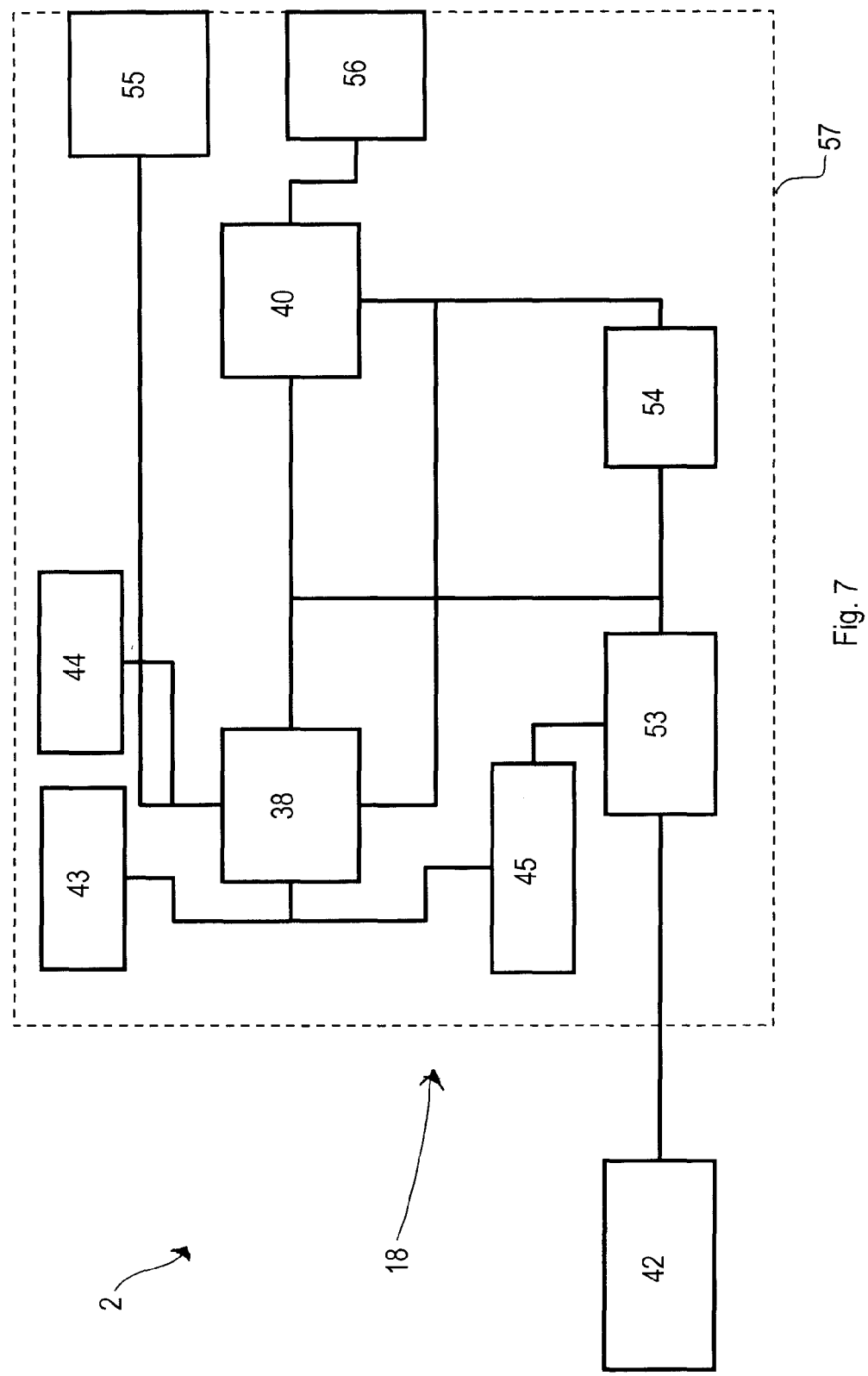
FIG. 7 is a diagram of a movable device included in the system.

In a second embodiment, the system 2, with reference to FIG. 3, includes a movable device 18 configured for exchanging information with the container 1, in particular for acquiring data from the latter. The movable device 18, which will be disclosed in detail in FIG. 7, is provided for the operator 12, and/or can be provided on the collecting vehicle 13. In this last configuration, it is not necessary for the operator 12 to alight from the vehicle 13 to place the movable device 18 in contact with the container 1. This is very useful for facilitating waste inspection and collection operations. The movable device 18 is configured for remote interaction with the container 1. The movable device 18 communicates autonomously with the container 1 when the operator 12 approaches the latter, thus acquiring information/data.

In particular, the data stored in the electronic unit 16 are sent to the movable device 18 to be subsequently transferred to the departmental station 3 and/or to the central operating station 19.

In particular, sending the data from the measuring device 10 to the movable device 18 can occur during the operations of replacing the bag 7 by the operator 12.

The container 1 is identified univocally so as to be discriminated on the basis of set historical analyses that take account of the intensity and the manner with which the container 1 is used by the users.

At the moment of data collection the movable device 18 with which the operator 12 is provided also has to record the geographical position in which it has interacted with the container 1. This enables passive geolocation of all the containers 1, keeping the inventory up to date.

The operator 12, at the end of his shift, returns to the departmental station 3 and/or to the central station 19, where he can unload all the data contained in the movable device 18 through a wireless or cable connection.

At the central station 3 the data are stored in a general file 25 in order to be able to create the necessary reports and analyses. At the central station 3 the information/data 26 is processed to define analytical and synthetic representations 22 and is supplemented and correlated with cartographic data supplied by a cartographic database 20.

Figure 8:
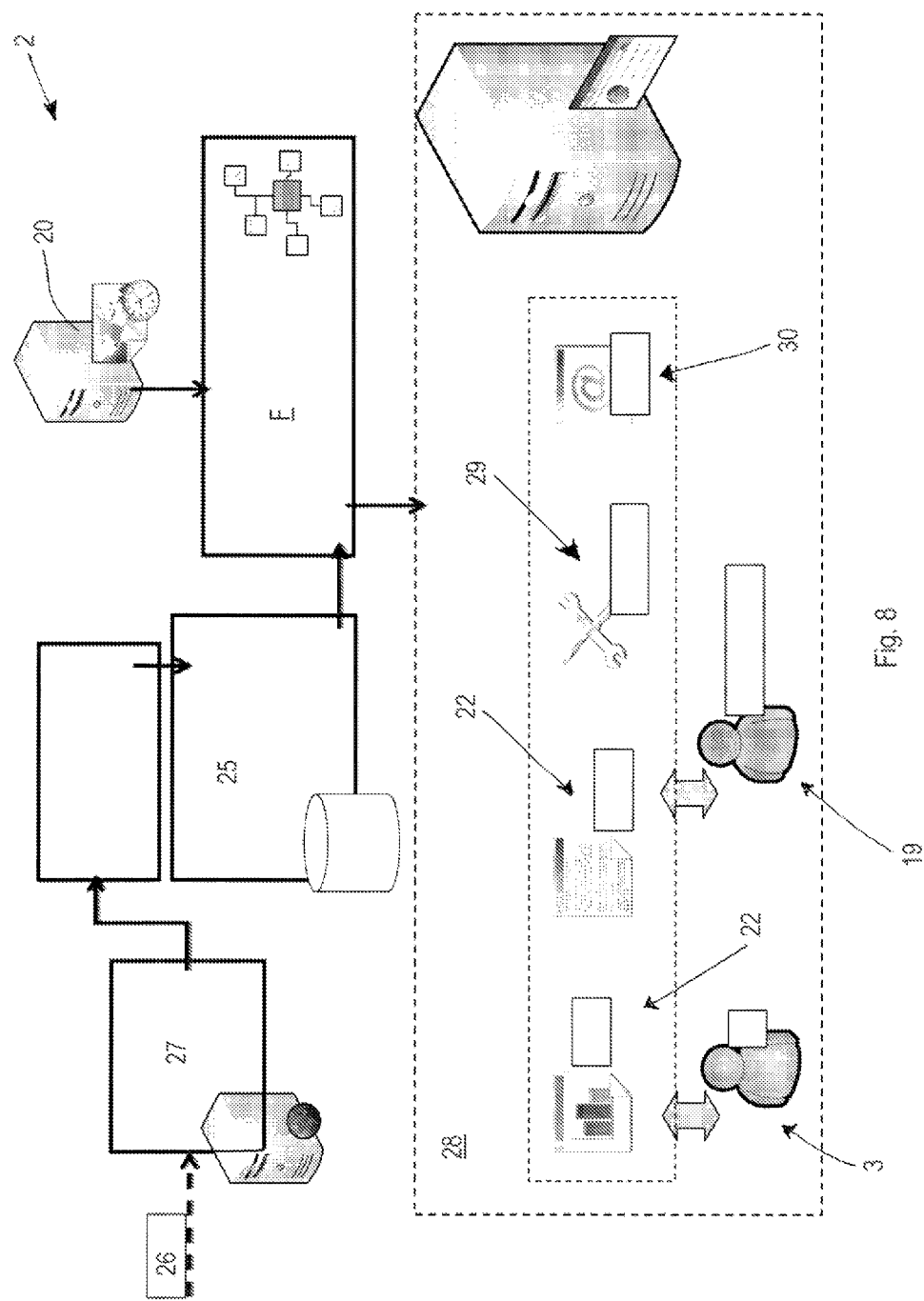
FIG. 8 is a diagram that shows how data and/or information are managed in the system according to the invention.

FIG. 8 shows a mode with which the various information/data 26 relating to the containers 1 flows into the system 2. The data 26 saved on the movable devices 18 can be sent via Internet to an Internet server 27 where they are entered in the general file 25. In the general file 25 there is data identifying and locating the containers 1, data relating to current readings, and historical data associated with the various containers 1.

The information/data 26 is extracted from the general file 25 to be processed and integrated with information taken from the cartographic database 20, as indicated by the step F, so as to generate analytical and synthetic representations 22 that can be displayed graphically via a graphic user interface 28.

The departmental stations 3 and/or the central stations 19, owing to the user interface 28, are able to analyse and display various data, generate reports and documents and carry out or plan various intervention activities 29, for example maintenance activities, and generate alarm signals 30.

Figure 5:
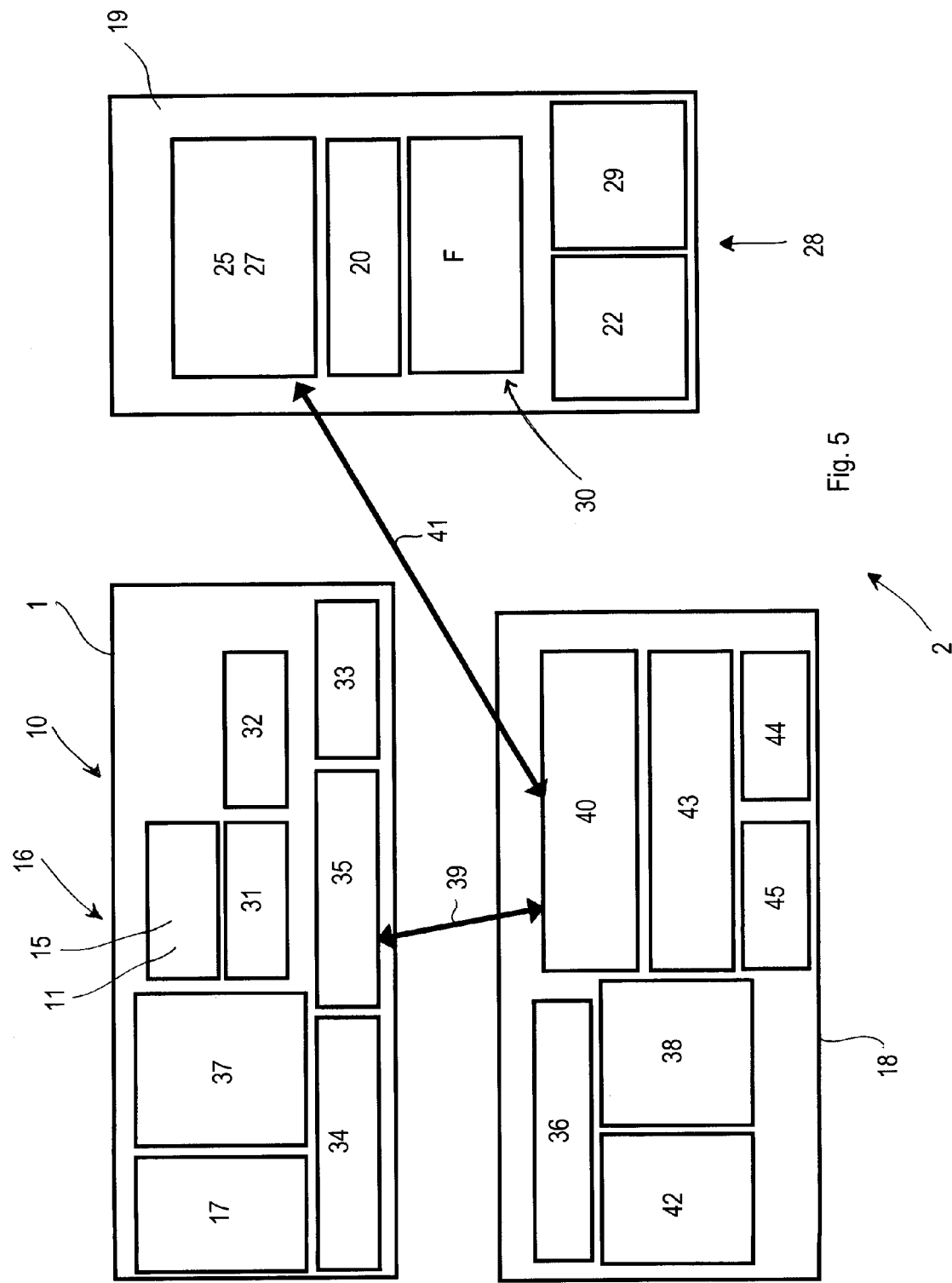
FIG. 5 is a diagram illustrating various parts of the system including the container according to the invention.

With reference to FIG. 5 certain parts of the system 2 are disclosed, in particular the container 1 and the movable device 18 are disclosed in greater detail. In particular, in FIG. 5 there is shown schematically the supply source 17 and the measuring device 10 comprising the metal plates 11 with which the container 1 and the electronic unit 16 are provided. The electronic unit 16 comprises a first processor 37 for processing data and/or signals by set algorithms. The container 1 further comprises a clock 31 and a temperature sensor 32.

The container 1 is provided with a local memory 33 that stores the information/data 26 that are subsequently sent to the departmental station 3 and/or to the central station 19 or to the movable device 18, with which the operator 12 is provided. The transmission of information/data 26 can take place via a first receiving-transmitting module 35 included in the container 1. The first receiving-transmitting module 35, depending on the transmission configurations that it is desired to obtain as disclosed previously, comprises a GPRS module and/or a short-range wireless module.

The container 1 is provided with a first interface 33 of serial and/or of JTAG type that conducts the diagnoses of various electronic parts of the container 1 rapidly and cheaply and programmes and/or debugs the various components of the electronic unit 16.

FIG. 5 shows in greater detail the movable device 18 with which the operator 12 is provided. The movable device 18 comprises a second interface 36 of JTAG and/or serial and/or USB type, by means of which the movable device 18 is connectable to the container 1 and/or to the departmental station 3, and/or to the central station 19. The movable device 18 comprises a second receiving-transmitting module 40, for example of short-range wireless type, by means of which communication 39 occurs between the movable device 18 and the container 1.

The movable device 18 is provided with a second processor 38 for processing, using set algorithms, data and/or signals that are exchanged with the container 1 and/or with the departmental station 3, and/or with the central station 19.

The movable device 18 can be configured for being connected for example to the central station 19, in particular to the general file 25, by a wireless or USB connection so as to establish a communication 41 for exchanging and/or transferring data.

The movable device 18 is further provided with a supply battery 42 and with a local memory 43 for storing the information/data 26.

The movable device 18 comprises a GPS module 44 by means of which the position of the operator 12 and/or of each container 1 in the urban area is identified. The GPS module 44 is able to detect its own position at the moment of data gathering. In this manner, the GPS module 44 enables the position of the single container 1 at the moment of data collection to be ascertained indirectly.

The movable device 18 is provided with a user interface 45, comprising an acoustic warning horn, for example for the buzzer type, and/or a visual warning lamp, for example of the LED type. At the moment of data collection the movable device 18 further synchronises and/or corrects the clock 31 of the container 1.

Figure 6:
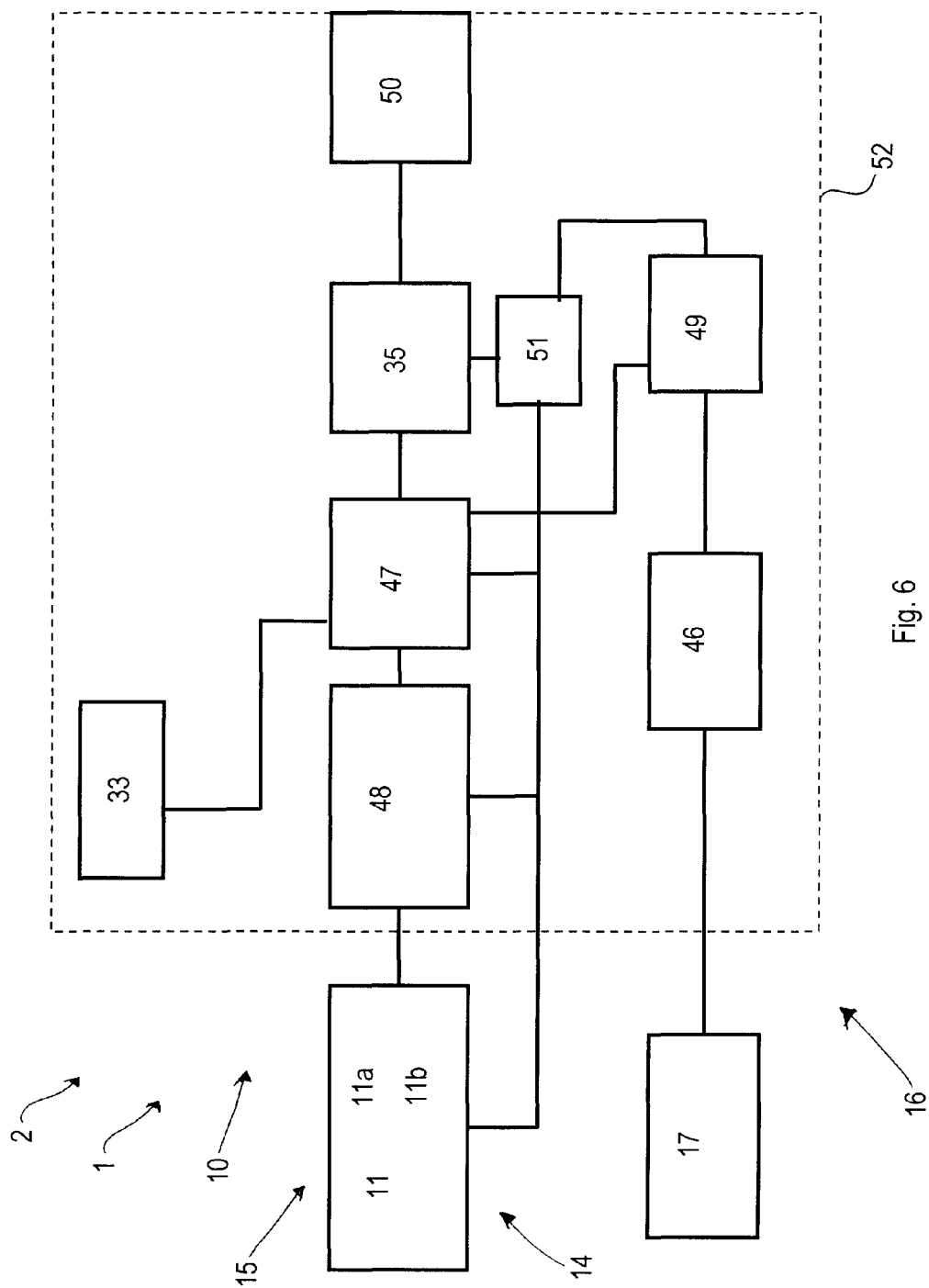
FIG. 6 shows schematically various parts included in the container.

With reference to FIG. 6, there are shown in greater detail various electric/electronic parts included in the container 1, in particular in the electronic unit 16, some of which have already been disclosed with reference to FIG. 5. An electric converter 46 is provided that acts on the electric current dispensed by the battery 17. The electric converter 46 can be configured for receiving a direct current input and for releasing a direct current output at a set voltage value. This value can, for example, be equal to 3.3 volt. The electronic unit 16 is provided with a microprocessor 47 suitable for processing and exchanging signals with other parts that are operationally connected thereto, for example with the local memory 33. A digital capacity meter 48 is provided for measuring the capacity value of the capacitor system 15, defined by the plates 11. A detecting device 49 is provided that is used to detect parameters of the electric current coming from the electric converter 46. The detecting device 49 is connected bidirectionally to the microprocessor 47 to send and/or receive information and/or command signals.

An antenna 50 is provided for sending information/data connected to the first receiving-transmitting module 35, already disclosed previously with reference to FIG. 5. The electronic unit 16 is provided with a switch 51 connected operationally to the first receiving-transmitting module 35, to the digital meter 48, to the detecting device 49 and to the microprocessor 47.

The local memory 33, the digital capacity meter 48, the microprocessor 47, the first receiving-transmitting module 35, the antenna 50, the switch 51, the electric converter 46 and the detecting device 49 together define an electronic board 52.

The various parts disclosed above are connected together so as to permit operation in the desired modes. For example, the container 1 that is thus configured is able to store data relating to filling of the containing cavity 5 in given intervals of time that can be suitably set and selected. The container 1 that is thus configured, when it is interrogated by a movable device 18, is activated to send the data stored in the local memory 33. Alternatively and/or additionally, the container 1 can be configured for communicating autonomously with the departmental station 3 and/or with the central station 19, in particular for sending alarm signals relating to the filling status thereof, or for periodically sending various types of information the status or operating condition thereof.

With reference to FIG. 7 below, various electric/electronic parts included in the movable device 18, are disclosed in greater detail, some of which have already been disclosed with reference to FIG. 5.

The movable device 18 comprises a further electric converter 53 that acts on the electric current dispensed by the supply battery 42. The further electric converter 53 can be configured for receiving a direct current input and for releasing a direct current output at a set voltage value.

This value can, for example, be equal to 3.3 volt. The further electric converter 53 is connected to the user interface 45.

A further detecting device 54 is provided that is used to detect parameters of the electric current coming from the further electric converter 53. The further detecting device 54 is connected bidirectionally to the second microprocessor 38 to send and/or receive information and/or command signals. The movable device 18 is provided with a USB port 55 by means of which the movable device 28 can be connected to an apparatus of the departmental station 3 and/or of the central station 19 to enable the information/data 26 to be exchanged. The memory 43, the GPS module 44, the USB port 55, the second receiving-transmitting module 40, to which an antenna 56 is connected, the further detecting device 54, the further electric converter 53, and the user interface 45 are operationally connected to the second processor 38.

These parts together define a further electronic board 57.

The measuring device 10 disclosed above is highly resistant to environmental factors and atmospheric agents, is reliable, has low consumption and requires no maintenance, or at most requires much reduced maintenance.

The system 2 is easy to manage and can be immediately understood by all operators, both those assigned to emptying the container 1 and those working remotely in the departmental stations 3 and/or in the central station 19. The system 2 enables costs to be reduced because it optimises the waste collection cycle, being particularly advantageous, for example, for municipal administrations. The quality of the containers 1 emptying service is thus also improved, a cleaner town being thus obtained.

The solution proposed above for measuring filling status and, in particular, the filling status of a container, can be used not only in the field of managing waste but also in various other industrial applications and/or environments. The solution disclosed above can be adapted to containers having any desired geometrical shape and dimensions.

Variations and/or additions to what have been disclosed above and illustrated in the attached drawings are possible.

The invention claimed is:

1. A container, comprising a casing defining a containing cavity for receiving objects and including a measuring device for detecting a filling status of said containing cavity, said measuring device comprising a capacitive device that is positionable near said containing cavity and configured for detecting a variation in electric capacity caused by the presence of said objects so as to determine said filling status, wherein said capacitive device comprises a plate arrangement that is positionable in peripheral zones of said containing cavity, configured for detecting a total filling status or a partial filling status of said containing cavity, said capacitive device comprising a first plate arrangement and a second plate arrangement, mutually arranged at opposite ends with respect to said containing cavity and arranged on or in said casing, said first plate arrangement and said second plate arrangement comprising a plurality of first plate elements and a plurality of second plate elements, respectively, which are positionable in a manner distributed parallel to a longitudinal axis of said containing cavity so as to be able to detect a plurality of progressive filling levels of said containing cavity, the introduction of an object inside said containing cavity determining a variation in the dielectric constant or in the geometry of the equivalent capacity, wherein said container is a waste container for containing non-homogenous objects, said casing being shaped so as to be able to house a bag for receiving the waste, said bag being intended to be interposed between said plurality of first plate elements and said plurality of second plate elements.

2. A container according to claim 1, wherein said first plate arrangement and said second plate arrangement lie on surfaces that laterally bound said containing cavity and which are arranged transversely to a plane defined by an opening through which said objects are introduced into said containing cavity.

3. A container according to claim 1, wherein each of said first plate elements and said second plate elements has a height between 10 and 30 cm and a width between 30 and 70 cm.

4. A container according to claim 1, and further comprising an electronic unit provided with a processor for processing data and/or signals and a digital capacity meter.

5. A container according to claim 4, and further comprising a local memory for storing information/data, supplied in particular by said processor.

6. A container according to claim 1, and further comprising a first receiving-transmitting module for transmitting data.

7. A container according to claim 6, wherein said first receiving-transmitting module comprises a GPRS module or is configured for short-range wireless transmission.

8. A container according to claim 1, and further comprising a supply source connected with said measuring device.

9. A container according to claim 8, wherein said supply source comprises a battery that is rechargeable by a recharging photovoltaic device.

10. A container according to claim 1, and further comprising an interface of serial and/or of JTAG type.

11. A container according to claim 1, and further comprising a clock and a temperature sensor.

12. A container according to claim 1, and further comprising a luminosity sensor device for detecting an occlusion of said containing cavity independently of whether a filling threshold of said containing cavity has been reached.

13. A container according to claim 12, wherein said luminosity sensor device, which is positionable in said containing cavity, is chosen from a group comprising phototransistor sensors and photocell sensors.

14. A container according to claim 13, and having a height between 40 cm and 140 cm and a width and a depth between 20 cm and 80 cm.

15. A system for monitoring and managing urban waste comprising a container according to claim 1 and a station configured for receiving and processing data provided by said measuring device so as to monitor said filling status and plan intervention activities on and/or manage, said containing cavity.

16. A system according to claim 15, wherein said station is configured for receiving data sent by said measuring device via a wireless connection of GPRS type.

17. A system according to claim 15, and further comprising a movable device for acquiring data from said measuring device to transfer the data to said station.

18. A system according to claim 17, wherein said movable device is configured for being connected to said measuring device via a wireless connection.

19. A system according to claim 17, wherein said movable device is provided with a memory and with a further interface of JTAG and/or serial and/or USB type by means of which said movable device is connectable to said measuring device and/or to said station.

20. A system according to claim 17, wherein said movable device comprises a GPS module for geolocating said containing cavity.

21. A system according to claim 17, wherein said movable device is provided with an acoustic-visual warning device.

* * * * *